United States Patent [19]
Hamill et al.

[11] 3,711,605
[45] Jan. 16, 1973

[54] ANTIBIOTIC A150A

[75] Inventors: Robert L. Hamill, New Ross; Michael E. Haney, Jr., West Lafayette; Marvin M. Hoehn, Indianapolis, all of Ind.

[73] Assignee: Eli Lilly and Company, Indianapolis, Ind.

[22] Filed: May 14, 1971

[21] Appl. No.: 143,344

[52] U.S. Cl................................................424/122
[51] Int. Cl.............................................A61k 21/00
[58] Field of Search.......................424/122; 195/80

[56] References Cited

OTHER PUBLICATIONS

Miller, The Pfizer Handbook of Microbial Metabolities, McGraw–Hill Book Co., Inc., 1961, page 580.

*Primary Examiner*—Jerome D. Goldberg
*Attorney*—Everett F. Smith and Walter E. Buting

[57] ABSTRACT

Antibiotic A150A, produced by *Streptomyces hygroscopicus* strain NRRL 3444 under submerged aerobic fermentation conditions in liquid culture medium and recovered from the fermentation broth any mycelium by extraction, has activity against a variety of microorganisms, including bacteria, fungi, and protozoa, and is especially active against some plant pathogens.

1 Claim, 1 Drawing Figure

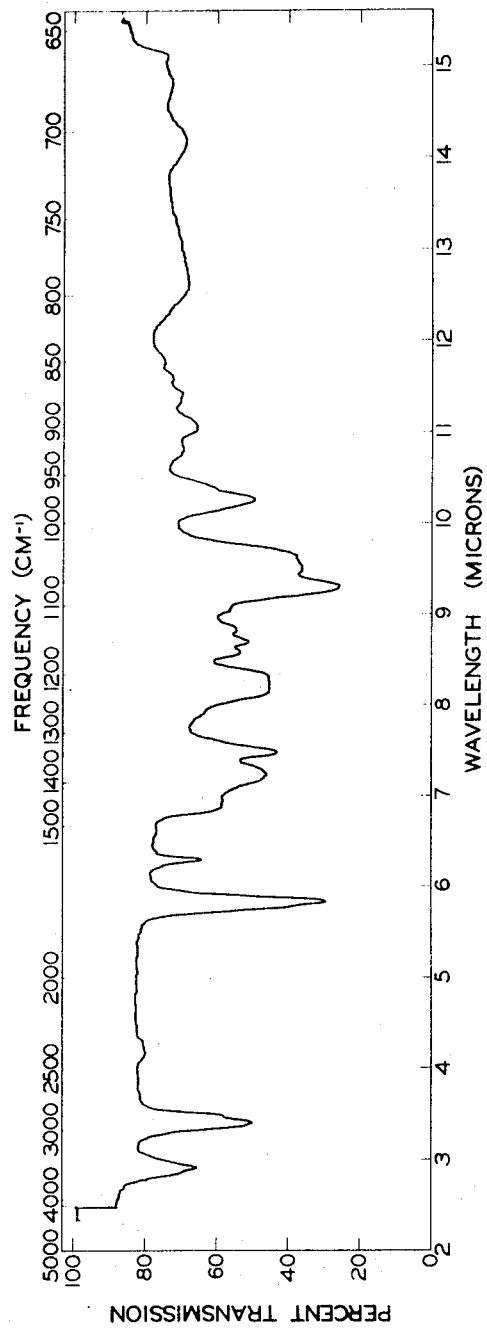

ANTIBIOTIC A150A

SUMMARY

This invention relates to a novel antibiotic and to a method for its production. In particular it relates to a neutral, nitrogenous antibiotic produced by culturing *Streptomyces hygroscopicus* NRRL 3444 under submerged aerobic fermentation conditions in a nutrient culture medium containing assimilable sources of carbon, nitrogen and inorganic salts.

The antibiotic of this invention, arbitrarily designated herein as antibiotic A150A, inhibits the growth of microorganisms which are pathogenic to animal and plant life. Antibiotic A150A is especially useful in the control of fungal diseases of economically important plants in particular bean rust and wheat leaf rust.

The antibiotic A150A is recovered from the fermentation medium by filtering the mycelium and thereafter extracting the antibiotic activity from both the mycelium and the crude filtered broth. The antibiotic is isolated from the extract as a crude oil by evaporating the extract to dryness in vacuo. The crude antibiotic A150A can be purified and obtained crystalline by chromatography over silica gel or alumina followed by crystallization from benzene or ether.

DETAILED DESCRIPTION

Antibiotic A150A as isolated is obtained as a white, crystalline substance having a melting point of about 166°–168°C.

A150A is insoluble in water and hydrocarbons such as hexane. It is soluble in the lower alcohols such as methanol, ethanol, and the like, esters such as methyl acetate, ethyl acetate and amyl acetate, the lower alkyl ketones such as acetone and methyl ethyl ketone, the lower alkyl ethers such as diethyl ether and di-n-propyl ether, the halogenated hydrocarbons such as chloroform, and aromatic hydrocarbons such as benzene, toluene, and the like.

Antibiotic A150A is stable from pH 1 to pH 8, but it is unstable above pH 9.

The specific optical rotation, $(\alpha)_D^{25}$, of A150A is +66.86° (C=1, methanol).

Electrometric titration of A150A in 66% aqueous dimethylformamide shows the absence of titratable groups.

Antibiotic A150A reacts with acetic anhydride in the presence of pyridine to yield an acetylated derivative. The molecular weight of A150A, as calculated from mass spectral data obtained with the acetyl derivative, is approximately 735. Microanalysis of A150A gives the following elemental composition:

65.06 percent carbon
8.87 percent hydrogen
1.89 percent nitrogen
23.39 percent oxygen The empirical formula of A150A as calculated from the microanalytical and mass spectral data was determined to be $C_{40}H_{65}NO_{11}$.

A power X-ray diffraction pattern of crystalline A150A using vanadium filtered chromium radiation and a wavelength value of 2.2896 A for calculating the interplanar spacings gives the following values:

| d | $I/I_1$ |
|---|---|
| 20.80 | 0.50 |
| 15.27 | 0.30 |
| 13.27 | 1.00 |
| 10.54 | 0.20 |
| 9.67 | 0.10 |
| 8.38 | 0.15 |
| 7.16 | 0.40 |
| 6.72 | 0.10 |
| 6.05 | 0.60 |
| 5.55 | 0.40 |
| 5.23 | 0.50 |
| 5.01 | 0.40 |
| 4.88 | 0.40 |
| 4.71 | 0.30 |
| 4.54 | 0.10 |
| 4.35 | 0.05 |
| 4.08 | 0.30 |
| 3.76 | 0.05 |
| 3.66 | 0.05 |
| 3.35 | 0.05 |
| 3.10 | 0.05 |

The infrared absorption spectrum of A150A in chloroform solution is shown in the accompanying drawing. The following distinguishable absorption maxima in the spectrum are observable over the range of 2.0 to 15.0 microns: 2.92, 3.4, 5.85, 6.3, 7.25, 7.5, 8.15–8.35, 8.6, 8.7, 9.32, and 10.29 microns.

Ultraviolet absorption spectra of A150A show absorption maxima at 274 $\mu$ ($E_{1cm}^{1\%}$=85) under basic conditions. No absorption was observed under acidic or neutral conditions.

The paper chromatographic behavior of A150A is shown by the $R_f$ values listed in Table 1. The values were obtained in the indicated solvent systems with the use of Whatman No. 1 paper in each instance. The location of the antibiotic on the chromatogram was determined by bioautograph using *Sarcina lutea* as the detecting organism.

TABLE I
Paper Chromatography of Antibiotic A150A

| Solvent System | $R_f$ Value* A150A |
|---|---|
| Butanol saturated with water; 2% p-toluenesulfonic acid | 0.87 |
| Methylisobutylketone saturated with water | 0.72 |
| Methylisobutylketone saturated with water; 2% p-toluenesulfonic acid | 0.73 |
| Methylisobutylketone saturated with water; 2% piperidine | 0.67 |
| Water:methanol:acetone (12:3:1)** | 0.51 |
| 10% aqueous propanol | 0.50 |
| Butanol:ethanol:water (13:5:15:150) | 0.75 |

*$R_f$ value is defined as the ratio of the distance traveled by the antibiotic from the origin to the distance traveled by the solvent front from the origin.

**This solution is adjusted to pH 10.5 with $NB_4OH$; then the pH is lowered to 7.5 with $H_3PO_4$.

Thin layer chromatography of antibiotic A150A on silica gel plates run in ethyl acetate solvent shows an active factor having an $R_f$ value of 0.61 as detected by vanillin or sulfuric acid spray. Bioautographs of thin layer plates may be prepared with the use of sensitive organisms such as *Sarcina lutea*.

The novel antibiotic of this invention has an inhibitory action against the growth of microorganisms, including bacteria, fungi, and protozoa, which are pathogenic to animal and plant life and is therefore useful in suppressing the growth of such organisms. The minimum inhibitory concentrations of A150A as determined by the agar dilution test are listed in Table II.

TABLE II

In Vitro Antibiotic Activity of A150A

| Test Organism | Minimum Inhibitory Concentration (mcg/ml) |
|---|---|
| Staphylococcus aureus | 100.00 |
| Bacillus subtilis | 25.00 |
| Mycobacterium avium | 25.00 |
| Trichophyton mentagrophytes | < 6.25 |
| Alternaria solani | < 6.25 |
| Botrytis cinerea | < 6.25 |
| Ceratostomella ulmi | 25.00 |
| Cladosporium resinae | 100.00 |
| Colletotrichum pisi | < 6.25 |
| Helminthosporium sativum | 100.00 |
| Pullularis sp. | 100.00 |
| Spicaria divaricata | 25.00 |
| Neegleria gruberi (acanthameba) in tissue culture | 50.00 |

When tested in disc plate tests, A150A also produces discernible zones of inhibition against the microorganisms *Ochromonas malhamensis*, *Chlorella vulgaris*, and *Scenedesmus basiliensis*.

The antibiotic of this invention, when applied to plants, will inhibit the development of certain plant diseases. It is active against powdery mildew in bean plants, bean rust, anthracnose in cucumbers, rice blast, and leaf rust in wheat.

The precise manner of application of antibiotic A150A to plants is not critical. Generally, initial contact of the causative organism is with plant foliage; for this reason, foliar application of antibiotics is often preferred.

The present method for controlling plant-pathogenic fungi is by application of an effective amount of antibiotic A150A to a plant exposed to the fungi. In preparing formulations for such applications, the antibiotic can be modified with water or other liquid carriers, organic solvents, surface-active agents, inert finely-divided solids, or inert granular solids. The exact concentration of antibiotic in such formulations is not critical and will vary with the particular purpose for which the formulation is designed.

In preparing liquid formulations, antibiotic A150A can be compounded with a suitable liquid and a surface-active dispersing agent to produce emulsifiable concentrates which can be further diluted with water or other liquid to form spray mixtures. In the preparation of dust compositions, the antibiotic can be compounded with any of the finely divided solids or granules typically used in agricultural chemical formulations.

The antibiotic can be applied to plants in any convenient fashion, such as by means of hand dusters or sprayers. Application of A150A formulations to plants can be conveniently carried out with powder dusters, boom sprayers, high-pressure sprayers, and spray dusters. In such foliar applications, the employed compositions should not contain any appreciable amount of phytotoxic diluents.

The following examples illustrate the use of antibiotic A150A for the control of plant pathogens and will enable those skilled in the art to practice the same.

Control of Wheat Leaf Rust

Antibiotic A150A was evaluated for the control of wheat leaf rust (*Puccinia recondita*). The evaluation was carried out in accordance with the following procedure: 4-inch pots of soil were thickly seeded with wheat and held under typical greenhouse conditions for 6 days.

The inoculum for the plants was prepared by harvesting uredospores of wheat leaf rust from infected wheat and suspending the spores in distilled water.

Treating solutions consisted of antibiotic A150A dissolved at concentrations of 50, 100, 200, and 400 ppm in a mixture of ethanol:1% acetone (1:1) containing 0.1% polyoxyethylene sorbitan monolaurate. Each solution was sprayed onto the wheat in two pots and allowed to dry; the wheat was then inoculated with the aqueous spore suspension by spraying. The pots were placed in a moist chamber at 18°C for 48 hours, and were thereafter returned to the greenhouse and held under typical greenhouse conditions for 6 days. Controls were sprayed with solvent containing no compound; otherwise, they were treated identically.

Results of the evaluations were as set forth in the following table, using the disease rating system below:

1 — severe
2 — moderately severe
3 — moderate
4 — slight
5 — no disease

TABLE III

Control of Wheat Leaf Rust

| Concentration of A150A in Treating Solution (ppm) | Disease Rating |
|---|---|
| 50 | 4, 3 |
| 100 | 4, 4+ |
| 200 | 4+, 4+ |
| 400 | 5, 4+ |

Untreated control plants showed extensive symptoms of wheat leaf rust. No phytotoxicity was observed.

Control of Bean Rust

Antibiotic A150A was also evaluated for control of bean rust (*Uromyces phaseoli* var. *typica*). The evaluation was carried out as follows: Four bean seeds were planted in sand in 4-inch pots and held under typical greenhouse conditions for 9 days, during which time two of the plants were thinned out.

An inoculum was prepared by suspending 50 mg. of spores of the causative organism (harvested from diseased bean plants) in 100 ml. of distilled water.

The primary leaves of each plant were inoculated with rust spores and the plants placed in a moist chamber at 18°C for 24 hours. The plants were then removed from the pots, and were placed in test tubes containing antibiotic A150A in physiological saline, and held in the greenhouse for 6 days. Under these conditions, the plants were aerated four times daily. Controls consisted of bean plants inoculated with fungus and placed in tubes containing saline without antibiotic. Readings were made in accordance with the disease rating scale previously reported above. Averages from several tests are shown in the following table:

TABLE IV

Control of Bean Rust

| Concentration of A150A in Treating Solution (ppm) | Disease Rating |
|---|---|
| 40 | 5 |
| 20 | 5 |
| 10 | 4 |
| 5 | 3 |

Untreated control plants showed extensive symptoms of bean rust. Slight to moderate phytotoxicity was observed in plants treated with the higher levels of A150A.

Antibiotic A150A also exhibits inhibitory activity against powdery mildew in beans, anthracnose in cucumbers, and rice blast when administered as a foliar spray.

The actinomycete used for the production of the antibiotic of this invention has been identified as a strain of *Streptomyces hygroscopicus* (Jensen) Waksman and Henrici. The organism has been deposited with the permanent culture collection of the Northern Utilization Research and Development Division, Agricultural Research Service, U.S. Dept. of Agriculture, Peoria, Ill. Its accession number in this collection is NRRL 3444. The strain was isolated from a soil sample collected in Korea by suspending portions of the sample in sterile deionized water and streaking the suspensions on nutrient agar in Petri plates. After incubation at 25–30° C colonies of the A150A-producing organism were transferred to agar slants with a sterile platinum loop. The agar slants were then incubated to provide a suitable inoculum for the production of A150A.

The methods employed in the taxonomic studies of the A150A-producing culture, NRRL 3444, were those recommended for the International Streptomyces Project [Shirling and Gottlieb, *Intern. Bull. Systematic Bacteriol.*, 16:313–340 (1966)], together with certain supplementary tests. Results of the taxonomic studies are summarized in the paragraphs which follow. Color names were assigned according to the Inter-Society Color Council — National Bureau of Standards (ISCC-NBS) method (Kelly and Judd, the ISCC-NBS Method of Designating Colors and a Dictionary of Color Names, U.S. Dept. of Commerce Circ. 553, Washington, D.C. 1955). Letters in parentheses refer to color blocks and underlined letters and numbers to color tabs in the Tresner and Backus color series [*Appl. Microbiol.* 11:335–338 (1963)]. The Maerz and Paul color block designations [*Dictionary McGraw-Hill Color*, McGraw Hill Book Co., Inc. New York (1950)] are enclosed in brackets. ISP numbers refer to International Streptomyces Project media (available from Difco Laboratories, Detroit, Mich.). Observations were made following incubation at 30°C for 14 days unless otherwise noted.

The organism is principally characterized by the formation of tightly coiled sporophores and by brownish gray aerial mycelium which produce a distinctive hygroscopic character on certain media.

The organism is a member of the Spira section — gray series as defined by Pridham et al. [*Appl. Microbiol.*, 6:52–79 (1958)] and is also classified in the Gray series of the Tresner and Backus system [*Appl. Microbiol.*, 11:335–338 (1963)].

Microscopic Morphology, Cultural Characteristics, and Physiology

| | |
|---|---|
| Microscopic Morphology: | Sporophores are usually tightly coiled with occasional hooks or loops produced. Spores are oval (1.9 μ × 1.3 μ) and generally occur in chains of more than 10. Spores are warty in outline as observed by electron microscopy. |
| Cultural Characteristics: | |
| ISP Medium No. 2 | Growth abundant; reverse light brown [13C7]. Aerial mycelium dark gray to black (GY) 3ih; hydroscopic. No soluble pigment. |
| ISP Medium No. 3 | Growth moderate; reverse olive gray [15C1]. Aerial mycelium dark gray (GY) 3ih; hygroscopic. No soluble pigment. |
| ISP Medium No. 4 | Growth abundant; reverse light grayish olive [21B1]. Aerial mycelium dark gray to black (GY) 3ih; hygroscopic. No soluble pigment. |
| ISP Medium No. 5 | Growth abundant; reverse light grayish olive [21B1]. Aerial mycelium yellowish gray to medium gray (GY) g. No soluble pigment. |
| Tomato Paste-Oatmeal Agar | No growth. |
| Emerson's Agar | Growth fair to moderate; reverse light olive [14J4]. Aerial mycelium white (W) a. No soluble pigment. |
| Bennett's Agar | Growth abundant; reverse light olive [22K1]. Aerial mycelium dark gray to black (GY) 3ih; hygroscopic. No soluble pigment. |
| Czapek's Agar | Growth fair to moderate; reverse pale yellow [11C2]. Aerial mycelium white (W) a. No soluble pigment. |
| Glucose-Asparagine Agar | Growth abundant; reverse light grayish olive [22C1]. Aerial mycelium brownish gray (GY) 5ih. No soluble pigment. |
| Tyrosine Agar | Growth fair; reverse light yellow brown [12B5]. No aerial mycelium. No soluble pigment. |
| Nutrient Agar | Very limited vegetative growth. |
| Calcium Malate Agar | Growth moderate; reverse pale yellow green [10C1]. No aerial mycelium. No soluble pigment. |
| Physiology: | |
| Temperature Requirements | Fair growth and sporulation at 26°C. Abundant growth and sporulation at 30° and 37°C. Sparse growth and slight aerial mycelium at 49°C. No growth at 55°C. |
| Melanin Production | |
| Peptone - Iron Agar | Negative. |
| Tyrptone - Yeast Extract Broth | Negative. |
| Skim Milk | Coagulation; peptonization |
| Response of vegetative color to pH change | Unaffected. |
| Nitrate Reduction | Positive. |

Table V summarizes the results of the carbon utilization tests carried out on the A150A-producing culture, NRRL 3444. Symbols employed in the table are as follows:

+ = positive utilization
(+) = probable utilization
(−) = questionable utilization
− = no utilization

TABLE V

Carbon Utilization of NRRL 3444

| Substrate | Response |
|---|---|
| L-arabinose | + |
| Sucrose | + |
| D-xylose | (+) |
| D-fructose | + |
| Glucose | (+) |
| Rhamnose | + |
| Raffinose | + |
| i-inositol | (−) |
| D-mannitol | (+) |

As previously noted, strain NRRL 3444 can be grown in a culture medium to produce antibiotic A150A. The culture medium can be any one of a number of media since, as is evident from the above-described utilization tests, the organism is capable of utilizing energy from a variety of sources. For economy of production, maximum yield, and ease of isolation of the antibiotic, however, certain culture media are preferable. For example, the media which are useful in the production of A150A include an assimilable source of carbon such as sucrose, fructose, glucose, molasses and the like. The preferred source of carbon is sucrose. In addition, employable media contain a source of assimilable nitrogen such as beef extract, peptones (meat and soy), hydrolyzed casein, yeast extract, amino acid mixtures, and the like. Presently preferred sources of nitrogen are peptones (meat and soy).

Mineral salts, for example, those providing calcium, magnesium, sodium, potassium, chloride, sulfate, and carbonate ions, and a source of growth factors, such as yeast or yeast extract, can be incorporated in the media with beneficial results.

As is necessary for the growth and development of other microorganisms, essential trace elements should also be included in the culture medium for growing the actinomycete employed in this invention. Such trace elements are commonly supplied as impurities incidental to the addition of the other constituents of the medium.

The initial pH of the culture medium can be varied. It has been found desirable, however, that the initial pH of the medium be between pH 5.5 and pH 7.0, and preferably about pH 5.8 to about pH 6.8. As has been observed with other actinomycetes, the pH of the medium gradually increases throughout the growth period of the organism while A150A is being produced, and may attain a level from about pH 7.0 to about pH 7.9, the final pH being dependent at least in part on the initial pH of the medium, the buffers present in the medium, and the period of time the organism is permitted to grow.

Submerged, aerobic cultural conditions are the conditions of choice for the production of A150A. For preparation of relatively small amounts, shake flasks can be employed, but for the preparation of large amounts of the antibiotic, submerged aerobic culture in sterile tanks is preferred. The medium in the sterile tank can by inoculated with a spore suspension, but, because of the growth lag experienced when a spore suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism. When a young, active vegetative inoculum has been obtained, it is transferred aseptically to the large tank. The medium in which the vegetative inoculum is produced can be either the same as or different from the medium utilized for the large scale production of A150A.

The organisms grow best at temperatures in the range of 30° to 37°C. Optimal A150A production appears to occur at a temperature of about 30°C.

As is customary in aerobic, submerged culture processes, sterile air is blown through the culture medium. For efficient growth of the organism and A150A production, the volume of air employed in the tank production of A150A preferably is 0.5 volumes of air per minute per volume of culture medium. Efficient growth and optimal yields of A150A are obtained when the volume of air is at least 0.3 volumes of air per minute per volume of culture medium.

The concentration of A150A activity in the culture medium can readily be followed during the fermentation period by testing samples of the culture broth for their inhibitory activity against the growth of microorganisms known to be inhibited in the presence of antibiotic A150A. The use of *Sarcina lutea* and *Bacillus subtilis* have been found to be suitable for this purpose. The testing can be carried out by the known turbidimetric or disc-plate methods.

In general, maximum production of the antibiotic occurs within about three to four days after inoculation of the culture medium when submerged aerobic culture conditions are employed.

Antibiotic A150A can be recovered from the fermentation mixture according to methods commonly employed for the isolation of antibiotics. Recovery methods employing extractive and chromatographic techniques for example can be used in the recovery and isolation of antibiotic A150A.

Accordingly the mycelium and undissolved solids are removed from the fermentation broth by conventional means such as filtration or centrifugation.

The antibiotic activity associated with the mycelium is extracted therefrom with a suitable solvent such as methanol, ethanol or acetone. Although in general small amounts of the antibiotic are recovered from the mycelium the amount obtained thereby varies. Such amounts justify recovery in the interest of economy.

The major amount of the antibiotic activity is found in the crude filtered broth and can be recovered by extracting the broth with a suitable solvent. Acceptable extraction solvents include the common esters such as ethyl acetate or amyl acetate, and the chlorinated hydrocarbon solvents such as chloroform and methylene dichloride. The preferred solvent is chloroform.

Conveniently, the mycelium extract is added to the crude filtered broth. The pH of the broth is then adjusted to about pH3 by the addition of a mineral acid and preferably with 6N hydrochloric acid. The acidified broth is then extracted with chloroform to recover the total antibiotic activity produced in the fermentation.

The chloroform extract is then decolorized and partially purified by passing the extract over a column packed with activated carbon. The antibiotic extract is then evaporated to dryness to yield antibiotic A150A as a crude oil.

The antibiotic can be further purified and obtained crystalline by chromatography over a suitable adsorbent. Chromatographic adsorbents such as silica and alumina can be employed in the purification of A150A.

Accordingly, the crude antibiotic A150A oil is dissolved in a suitable solvent such as ethyl acetate and the solution added to a column packed with silica gel. The antibiotic can be eluted with ethyl acetate or other solvents of like polarity. The eluate fractions containing antibiotic activity are combined and evaporated to dryness to obtain the purified A150A antibiotic as a solid amorphous residue.

The solid amorphous antibiotic can be obtained crystalline by crystallization from a suitable solvent, for example, ether or benzene.

Alternatively, the crude antibiotic A150A obtained as an oil from the broth extract can be obtained in an impure solid form by dissolving the oil in a solvent such as ether or benzene and diluting the solution with a hydrocarbon solvent such as hexane to precipitate the antibiotic as a non-crystalline solid. The antibiotic solid thus obtained can be further purified by chromatography over a suitable adsorbent such as silica gel as described previously.

The crude solid antibiotic is suitable for certain uses, for example, for incorporation in agricultural formulations for the treatment of diseased plants.

This invention is further illustrated by the following examples, but is not limited thereby.

Example 1

A. Shake-flask fermentation of A150A

The A150A-producing culture is prepared and maintained on an agar slant having the following composition:

| | |
|---|---|
| Glucose | 10.0 g |
| Yeast extract | 10.0 g |
| Beef extract | 4.0 g |
| Peptone | 4.0 g |
| NaCl | 2.5 g |
| Agar | 20.0 g |
| Deionized water | 1 liter |

The slant is inoculated with the A150A-producing culture, NRRL 3444, and incubated at 30°C for 4–6 days. The sporulated slant is covered with a small amount of sterile deionized water and gently scraped to provide an aqueous spore suspension.

One ml of the resulting spore suspension is used to inoculate 100 ml of sterile vegetative medium having the following composition:

| | |
|---|---|
| Glucose | 10.0 g |
| Peptone | 5.0 g |
| Beef extract | 5.0 g |
| NaCl | 5.0 g |
| Hydrolyzed casein* | 5.0 g |
| Deionized water | 1 liter |

*Enzymatic hydrolyzed casein (N-Z Amine, Sheffield Chemical Division of Natural Dairy Products, Norwich, N.Y.)

The inoculated vegetative medium is incubated for 48 hours at 30°C on a reciprocal shaker having a 2-inch stroke at 108 strokes per minute. A 10-ml portion of the resulting culture is then employed to inoculate 200 ml of sterilized production medium contained in a liter Erlenmeyer flask and having the following composition:

| | |
|---|---|
| Glucose | 10.0 g |
| Edible molasses | 20.0 g |
| Peptone (Difco Bacto) | 5.0 g |
| CaCO$_3$ | 2.0 g |
| Tap water | 1 liter |

The inoculated medium is allowed to ferment for 48 hours at 30°C on a reciprocal shaker operating at 108 strokes per minute. The terminal pH is 7.0.

B. Tank fermentation of A150A

The A150A-producing culture is prepared and maintained on an agar slant having the following composition:

| | |
|---|---|
| Sucrose | 10.0 g |
| Casamino acids (Difco) | 2.0 g |
| Malt extract | 0.25 g |
| Yeast extract | 0.25 g |
| KCl | 0.5 g |
| MgSO$_4$·7H$_2$O | 0.5 g |
| FeSO$_4$·7H$_2$O | 0.01 g |
| KH$_2$PO$_4$ | 1.0 g |
| Meer Agar (Washed 3X)* | 20.0 g |
| Deionized water | 1 liter |

*Meer Co., 318 W. 46the St., New York, N.Y.

The pH of the medium was not adjusted; th sterilization, the pH is 5.8.

The slant is inoculated with the A150A-producing culture, NRRL 3444, and incubated at 34°C for 7–10 days. The sporulated slant is covered with a small amount of sterile deionized water and gently scraped to provide an aqueous spore suspension.

Each slant is used to inoculate six flasks (50 ml/250 ml flask) of sterile vegetative culture medium having the following composition:

| | |
|---|---|
| Glucose | 10.0 g |
| Sucrose | 30.0 g |
| Peptone | 5.0 g |
| Hydrolyzed casein | 5.0 g |
| Hydrolyzed yeast* | 5.0 g |
| Beef extract | 5.0 g |
| CaCO$_3$ | 2.0 g |
| Tap water | 1 liter |

*Hydrolyzed yeast - Amber BYF 300, Amber Laboratories, Juneau, Wisconsin.

The pH of the medium is unadjusted; after sterilization, the pH is 6.5.

The inoculated medium is allowed to ferment for 48 hours at 30°C on a rotary shaker operating at 250 R.P.M. A 10-ml portion of the resulting culture is used to inoculate 200 ml of sterilized second-stage growth medium contained in a liter flask and having the same composition as that described above.

The inoculated medium is allowed to ferment for 48 hours at 30°C on a reciprocal shaker operating at 250 R.P.M. A 200 ml portion of the resulting culture is used to inoculate 25 liters of the following medium in a 40-liter fermentor:

| | Percent |
|---|---|
| Dow-Corning Antifoam "A" | 0.02 |
| Glucose | 1.5 |
| Sucrose | 3.0 |
| Peptone | 1.0 |
| Soybean grits | 1.0 |
| Molasses | 2.0 |
| CaCO$_3$ | 0.2 |
| Tap water | 25 liters |

The pH of the medium is 6.8 after sterilization.

The inoculated medium is aerated at a rate of one-half volume of air per volume of culture per minute and is stirred with conventional agitators at 420 R.P.M. Mp.

The fermentation is carried out at 30°C for about 88 hours.

Isolation of A150A

The fermentation broth from a 25-liter tank grown according to the procedure in the preceding section is filtered with 3% Hyflo supercel filter aid. The mycelial cake is extracted by stirring with 8 liters of methanol for one-half hour.

The resulting methanolic extract is concentrated in vacuo to remove the methanol. The filtrate and extract are combined, and the pH was adjusted to pH 3 with 6N hydrochloric acid. The acidified crude broth was extracted by stirring with 20 liters of chloroform for 15 minutes. The chloroform extract is concentrated to a small volume and passed through a column packed with carbon to remove color. The effluent is concentrated in vacuo to an oil. After the oil is dissolved in diethyl ether, ten volumes of petroleum ether are added to precipitate the active antibiotic factor. The precipitate is filtered, washed with cold hexane, and dried in vacuo. The precipitate is dissolved in 14 ml. of ethyl acetate and the solution is passed over a column packed with a mixture of 40 g. of silica gel H (E. Merck A. G., Darmstadt, Germany) and 20 g. of Hyflo supercel in ethyl acetate. The column is then developed with ethyl acetate. The eluates are monitored by thin-layer chromatography and microbial assay. The active fractions are combined and the total evaporated to dryness in vacuo to obtain antibiotic A150A as an amorphous solid. The residue is crystallized from warm benzene or from ether to obtain antibiotic A150A as a white crystalline compound melting at about 166–168°C.

We claim:

1. The antibiotic A150A, said antibiotic being characterized in its crystalline form as a white crystalline compound melting at about 166 to 168°C. which is substantially insoluble in water and hexane and is soluble in methanol, ethanol, ethyl acetate, acetone, diethyl ether, benzene and chloroform; which has an apparent molecular weight of 735 as determined by mass spectral data; which has an approximate elemental composition of 65.06 percent carbon, 8.87 percent hydrogen, 1.89 percent nitrogen and 23.39 percent oxygen as determined by microanalysis; which has a specific rotation $[\alpha]_D^{25}$ 66.86° (C = 1, methanol) which is non-titratable in 66 percent aqueous dimethylformamide; which has the following absorption maxima in its infrared absorption spectrum over the range of 2.0 to 15.0 microns: 2.92, 3.4, 5.85, 6.3, 7.25, 7.5, 8.15–8.35, 8.6, 8.7, 9.32, and 10.29 microns; and which shows an absorption maximum in its ultraviolet spectrum at 274 millimicrons of $E_{1cm}^{1\%} = 85$ at basic pH.

* * * * *